April 21, 1925.

F. KAUTER 1,534,451

COMBINED ROTARY UNIT

Filed April 11, 1922

Inventor:

Franz Kauter
By
Atty.

Patented Apr. 21, 1925.

1,534,451

UNITED STATES PATENT OFFICE.

FRANZ KAUTER, OF ZURICH, SWITZERLAND.

COMBINED ROTARY UNIT.

Application filed April 11, 1922. Serial No. 551,708.

*To all whom it may concern:*

Be it known that I, FRANZ KAUTER, a citizen of the Republic of Switzerland, residing at Zurich, Switzerland, have invented certain new and useful Improvements in Combined Rotary Units, of which the following is a specification, reference being had therein to the accompanying drawing.

The present invention relates to improvements in combined rotary units in which a driving rotor of one machine is adapted to act as the driven member of the other machine.

The invention consists in a fluid rotor composed of two tubular members, arranged for cooperation and preferably having blades in one member for fluid and guide blades in the other member. There is a rotor for an electric machine directly mounted on one or both tubular members and a stator surrounding the rotor.

Several constructional examples of the object of the present invention are shown on the accompanying drawings, in which.

Figure 1:
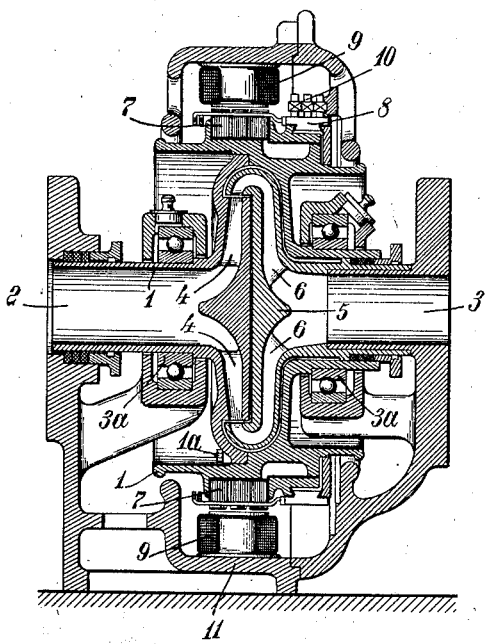
Fig. 1 illustrates a combination consisting of a centrifugal pump or compressor and an electric motor.

In the constructional example illustrated in Fig. 1, 1 denotes the fluid rotor of a centrifugal pump, which is journalled in the bearings 3ª. To enable the assembling and dismantling of the combination the fluid rotor 1 is made of two members rigidly connected together by means of screws 1ª. 4,4 denote the rotor blades. The guide wheel 5 is stationary and is provided with guide vanes 6. On its outer side the fluid rotor 1 carries the rotor or armature winding 7 and the commutator 8, the stator 11 being provided with the winding 9 and the brushes 10. The electric current is supplied to the winding 9 of the stator and causes a rotation of the two rigidly connected rotor members, whereby the liquid is drawn in at 2 and delivered under pressure at 3. This constructional example may also be utilized as a combined electromotor-centrifugal compressor.

Furthermore the above described combination may be used as a water turbine driving a dynamo. In this case the water under the available head is supplied at 3 and acts on the blades 4 whereby to the rotor 1 together with the winding 7 rotation is imparted and an electric current is thus generated. The combination of the two machines to one machine affords a simple and compendious construction.

Figure 2:
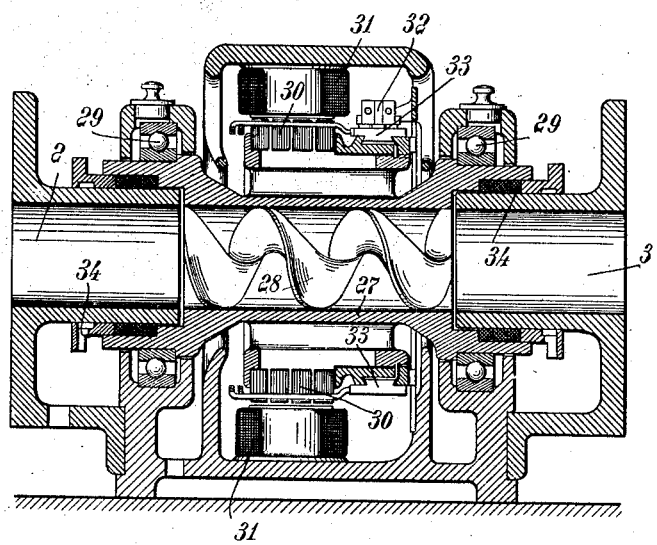
Fig. 2 is a screw-pump and an electromotor.

In the constructional example illustrated in Fig. 2, a screw pump is combined with an electromotor to one combined machine.

The tube 27 having a conveying screw 28 fixed to its interior is journalled in the bearings 29 and is provided on its exterior with the armature winding 30. The electric current is supplied to the stator winding 31 and acts through brushes 32 and commutator 33 onto the winding 30. Thereby the tube 27 is rotated and the screw 28 conveys liquid, paste or the like from 2 to 3. 34 denotes stuffing boxes. As the screw 28 and the tube 27 are rigidly connected a silent working is attained and the losses originating in the gap between screw and screw casing in the ordinary type screw pumps are avoided.

Thus machines of this type can be obtained by the combination of centrifugal pumps, centrifugal compressors, ventilators, screw pumps, electric generators etc. with steam-turbines, water-turbines, gas-turbines, electromotor, engines worked by compressed air and the like. Furthermore a belt pulley, toothed wheel or the like or a further machine may be arranged on the rotor of the device. In this manner combined units may be built which are of a solid and simple design, which require a very small space, and which can be built at very low costs as many details such as couplings, bearings, shafts, casings can at least to some extent be dispensed with.

I claim:

1. The combination with the electrical parts of an electric motor including a stator, a stator frame and a rotor within said stator; of a pump casing concentric with and forming part of said rotor, tubular extensions integral with said casing, bearings accessible from the outside and interposed between said stator frame and said tubular extensions for rotatably mounting said rotor, and a blade for fluid within said pump casing, said tubular extensions having a length relatively to the width of the electrical parts of said rotor that any leakage water splashed by centrifugal action clears said electrical parts.

2. The combination with the electrical parts of an electric motor including a stator, a stator frame and a rotor within said stator; of a pump casing concentric with and forming part of said rotor, tubular extensions integral with said casing, brackets on said stator frame, ball bearings accessible from outside, held in said brackets and in which said rotor is rotatably mounted, and a blade for fluid within said pump casing, the tubular extensions having a length relatively to the width of the electrical parts of said rotor that any leakage water splashed by centrifugal action clears said electrical parts.

In testimony whereof I affix my signature.

FRANZ KAUTER.